United States Patent
Kobayashi et al.

(10) Patent No.: US 6,179,931 B1
(45) Date of Patent: Jan. 30, 2001

(54) METHOD FOR REMOVING HARD COAT FILM FROM PLASTIC LENS

(75) Inventors: Tadashi Kobayashi; Yuyoshi Saito; Shoji Kato, all of Fukui (JP)

(73) Assignee: Asahi Lite Optical Co., Ltd., Fukui (JP)

( * ) Notice: Under 35 U.S.C. 154(b), the term of this patent shall be extended for 0 days.

(21) Appl. No.: 09/142,062

(22) PCT Filed: Feb. 19, 1998

(86) PCT No.: PCT/JP98/00690

§ 371 Date: Aug. 31, 1998

§ 102(e) Date: Aug. 31, 1998

(87) PCT Pub. No.: WO98/37984

PCT Pub. Date: Sep. 3, 1998

(30) Foreign Application Priority Data

Feb. 28, 1997 (JP) .................................. 9-045626

(51) Int. Cl.$^7$ ............................................ B08B 3/00
(52) U.S. Cl. .................................. 134/38; 134/42
(58) Field of Search ................... 134/30, 42, 38

(56) References Cited

U.S. PATENT DOCUMENTS

| | | | |
|---|---|---|---|
| 4,065,324 | * 12/1977 | Rankin | 134/30 |
| 4,067,815 | * 1/1978 | Scholl et al. | 252/8.1 |
| 4,127,423 | * 11/1978 | Rankin | 134/30 |
| 5,055,139 | * 10/1991 | Personette | 134/22.17 |
| 5,391,234 | * 2/1995 | Murphy | 134/38 |

FOREIGN PATENT DOCUMENTS

| | | |
|---|---|---|
| 62-117668A | 5/1987 | (JP) . |
| 62-149380A | 7/1987 | (JP) . |
| 6-248206A | 9/1994 | (JP) . |

* cited by examiner

*Primary Examiner*—Randy Gulakowski
*Assistant Examiner*—Yolanda E. Wilkins
(74) *Attorney, Agent, or Firm*—Jordan and Hamburg LLP

(57) ABSTRACT

As a method by which failed products of hard-coated plastic lenses, especially hard-coated high-refractive-index plastic lenses can be regenerated to be in a re-usable condition, plastic lenses coated with a hard coat consisting essentially of an organopolysiloxane compound and an inorganic oxide, are contacted with an aqueous solution of a silicate and/or a phosphate. For example, an aqueous solution of 30% trisodium phosphate heated at 50° C. is sprayed over hard-coated plastic lenses for 5 minutes. The hard coat is removed from the lenses, while the surface of the coat-removed lenses is not roughed. The coat-removed lenses are re-usable.

4 Claims, No Drawings

METHOD FOR REMOVING HARD COAT FILM FROM PLASTIC LENS

BACKGROUND OF THE INVENTION

The present invention relates to a method for removing the hard coat film from plastic lenses coated with a hard coat film.

Being different from glass lenses, plastic lenses are characterized in that they are lightweight, hardly cracked and easily colored. For such plastic lenses, acrylic resins, polycarbonate resins and ADC resins have heretofore been used. Recently used are high-refractive-index urethane resins, and those having a refractive index of larger than 1.6 have been commercialized in the market. Though having various advantages such as those mentioned above, plastic lenses are inferior to glass lenses in point of scratch resistance and heat resistance. To improve the scratch resistance of plastic lenses, proposed was a method of applying a protective coat onto the surface of the lenses, for which were proposed a numerous number of coating compositions of different types. For example, known are coating compositions consisting essentially of an organic silicon compound or its hydrolysate, such as those disclosed in Japanese Patent Application Laid-Open (JP-A) Sho-52-11261; and coating compositions containing a colloidal dispersion of silica sol, such as those in JP-A Sho-53-111336, the latter being for further improving the scratch resistance of plastic lenses coated therewith. Methods of applying such coating compositions onto plastic lenses have already been put into practical and industrial use.

For lens materials, ADC resin such as typically PPG's CR-39 has heretofore been widely used in producing plastic lenses for a long period of time. However, lenses of ADC resin have a refractive index of about 1.50, which is lower than that of glass lenses. Therefore, using the resin is problematic especially for powerful minus lenses for short-sightedness in that the peripheral edge of the lenses is to be thick. Those lenses of the resin look unattractive, and users do not like them. Lens materials having a higher refractive index than CR-39 are known. For example, JP-A Sho-63-46213, Hei-2-270859, Hei-2-275901 and Hei-3-56525 disclose sulfur-containing polyurethane resins for plastic lenses, and high-refractive index polyurethane lenses having a refractive index of higher than 1.6 have been put into practical use. Coating compositions such as those mentioned above are applied to those lenses. However, the coated lenses are defective in that they have interference fringes and look unattractive. It is said that such interference fringes appear due to the difference between the refractive index of the lens material and that of the overlying coat. A single-layered or multi-layered, non-glare layer of an inorganic compound is often formed over the coat. If the non-glare layer is formed, however, the color reflected on the layer is seen too greatly, resulting in that the lenses look more unattractive. In order to overcome those drawbacks, various studied have heretofore been made for increasing the refractive index of the coat of plastic lenses. For example, JP-A Hei-2-245078, Hei-2-261827, Hei-4-126784 and Hei-7-325201 disclose hard coat compositions containing high-refractive-index inorganic grains.

A high-refractive-index hard coat basically comprises an organic silicon compound and/or its hydrolysate, and inorganic grains, and its refractive index shall be slightly lower than or comparable to that of high-refractive-index base lenses to evade interference fringes. The organic silicon compound and its partial hydrolysate may be selected from alkylalkoxysilanes and/or ordinary silane-coupling compounds having reactive organic groups of epoxy group, vinyl group, (meth)acryl group, amino group, etc. Of those, especially preferred are epoxy-containing compounds. The inorganic grains may be of oxides such as silica, iron oxide, titanium oxide, cerium oxide, zirconium oxide, antimony oxide, zinc oxide or tin oxide, their mixtures or composite oxides. Of those, preferably used are titanium oxide, cerium oxide, iron oxide and zirconium oxide to form high-refractive-index coats applicable to high-refractive-index lens materials. Silica is said to have the activity of increasing the dispersion stability of other inorganic grains, and is often used as an aid in high-refractive-index coats comprising other inorganic grains. The inorganic grains constituting the coats may have a mean grain size of from 1 to 300 nm, but especially preferably from 5 to 100 nm. Apart from those components noted above, various additives such as catalyst, UV absorbent, film-forming resin or its precursor and leveling agent may be added to the coats to thereby improve the characteristics of the coats and even those of the coating compositions.

In the industrial process of producing plastic lenses, the reduction in the production yield due to processing failure is a critical problem as causing the increase in the production costs. Specifically, processing failure in hard coat formation or processing failure in non-glare coat formation which is often effected after the hard coat formation is a bar to the reduction in the production costs. Naturally, any processing failure shall be evaded so as to increase the production yield. In fact, however, some processing failure is inevitable. The processing failure in hard coat formation includes, for example, presence of impurities on or in the coat, coating unevenness, and whitening of the coat, and the failed products could not be commercial ones. Recycling those failed products is important for reducing the production costs and even for effective use of natural resources.

To remove the coat from plastic lenses, known are a method of physically peeling or cutting off the coat, and a method of releasing or dissolving the coat with some chemicals. The latter chemical method is preferred in order to reuse the coat-removed lens bases. For the removing method with chemicals, for example, it is written in Industrial Materials, Vol. 30, No. 8 that silicone hard coat resin is dissolved out when dipped in an aqueous solution of 10% sodium hydroxide for 24 hours. Japanese Patent Publication (JP-B) Hei-2-36309 discloses a method of recycling plastic lenses, comprising dipping plastic lenses coated with an organopolysiloxane hard coat in an aqueous solution of an alkali metal hydroxide to remove the coat; and JP-B Hei-3-5227 discloses a method of recycling plastic lenses, comprising dipping plastic lenses coated with a hard coat consisting essentially of an organic silicon compound and a curable organic compound, in an alkaline aqueous solution containing an aqueous solution of surfactant to remove the coat. In those methods, the hard coat of plastic lenses is corroded and dissolved to be thereby removed from the lenses. In those, however, inorganic substances are difficult to remove and, even if removed, they will again adhere to the lenses. For this, surfactant is added to the dipping solution to evade the re-adhesion. The methods are extremely effective in removing hard coats consisting essentially of an organopolysiloxane compound and formed on low-refractive-index lenses of CR-39.

However, high-refractive-index hard coats are more difficult to remove than low-refractive index ones. Therefore, if plastic lenses coated with such a high-refractive-index hard coat are desired to be removed in the method of dipping the coated lenses in an aqueous solution of an alkali hydroxide, and if the coated lenses are treated in the solution under the condition, temperature, time and alkali hydroxide concentration, for completely removing their hard coat, the urethane lens base is greatly influenced by the treatment resulting in that the surface of the base is partly corroded and roughened. The dipping methods are especially unfavorable for the removal of high-refractive-index hard coats from sulfur-containing polyurethane lenses, as being basically problematic in that some coat residue still remains on the lens base even after the treatment, that the lens base is poorly resistant to the aqueous solution of an alkali metal hydroxide and is therefore often roughened, and that the base lens treated could not be effectively recycled.

SUMMARY OF THE INVENTION

The object of the present invention is to provide a method of regenerating lens bases to be in a re-usable condition, in which even high-refractive-index hard coats formed on plastic lenses, especially on high-refractive-index polyurethane lenses can be effectively removed.

In the invention, plastic lenses coated with a hard coat consisting essentially of an organopolysiloxane compound and an inorganic oxide are contacted with an aqueous solution of a silicate and/or a phosphate.

Preferably, the silicate and/or phosphate are sodium and/or potassium salts.

In the method of the invention, the aqueous solution of a silicate and/or a phosphate used acts on the hard coat consisting essentially of an organopolysiloxane compound and an inorganic oxide to form fine cracks in the hard coat, through which the aqueous solution penetrates into the interface between the lens base and the hard coat to thereby swell the hard coat. As a result, the hard coat is peeled off from the lens base at the interface therebetween. Then, the silicate and/or phosphate protect both the peeled hard coat residue and the lens base to thereby prevent the re-adhesion of the residue onto the lens base.

DETAILED DESCRIPTION OF THE INVENTION

Now, the invention is described more concretely hereinunder with reference to the following Examples and Comparative Examples, which, however, are not intended to restrict the scope of the invention. Using an inspection light source (National Palook, three-wave type daylight color, 15 W), visually checked were the formation of interference fringes, the removal of hard coats and the surface roughness of treated lenses.

Example 1:

An urethane resin lens base having a refractive index of 1.594 (this was prepared by polymerizing a monomer, Mitsui Toatsu Chemical's MR-6) was dipped in a hard coat composition consisting essentially of a methanol sol dispersion of γ-glycidoxypropyltrimethoxysilane, methyltrimethoxysilane hydrolysate and cerium oxide-titania, and containing a curing catalyst of aluminium acetylacetonate and a silicone surfactant (the hard coat of the composition has a refractive index of 1.59), and the film formed on the lens base was thermally cured at 120° C. for 1 hour to produce a lens coated with a hard coat. No interference fringe was found in the lens. Next, an aqueous solution comprised of 30 parts of trisodium phosphate and 70 parts of water and heated at 50° C. was sprayed over this lens for 5 minutes, and the lens was then washed with water and dried. The hard coat was removed from the lens, and the lens surface was not roughened at all. The same hard coat composition as above was applied to this lens, and thermally cured in the same manner as above. The thus-coated lens was good.

Example 2:

An urethane resin lens base having a refractive index of 1.664 (this was prepared by polymerizing a monomer, Mitsui Toatsu Chemical's MR-7) was dipped in a hard coat composition consisting essentially of a methanol sol dispersion of γ-glycidoxypropylmethyltrimethoxysilane, tetramethoxysilane hydrolysate and cerium oxide-titaniaalumina, and containing a curing catalyst of aluminium acetylacetonate and a silicone surfactant (the hard coat of the composition has a refractive index of 1.62), and the film formed on the lens base was thermally cured at 120° C. for 1 hour to produce a lens coated with a hard coat. Next, this lens was dipped in an aqueous solution comprised of 10 parts by trisodium phosphate, 10 parts of sodium metasilicate and 80 parts of water and heated at 40° C., for 10 minutes. After having been taken out of the solution, the lens was washed with water and dried. The hard coat was removed from the lens, and the lens surface was not roughened at all. This lens was again dipped in the aqueous solution for 12 hours, but its surface did not change at all.

Comparative Example 1:

The hard coat lens as prepared in the same manner as in Example 1 was dipped in an aqueous solution of 20% sodium hydroxide containing 1% of cationic surfactant, at room temperature for 16 hours. After having been taken out of the solution, the lens was washed with water and dried. A white powdery residue was found on the surface of the lens.

Comparative Example 2:

The hard coat lens as prepared in the same manner as in Example 1 was dipped in an aqueous solution of 30% sodium hydroxide heated at 60° C., for 4 hours. After having been washed with water and dried, the lens had a white powdery residue partially on its surface, and the area of the base lens from which the hard coat had been removed was roughened.

Example 3:

An urethane resin lens base having a refractive index of 1.594 (this was prepared by polymerizing a monomer, Mitsui Toatsu Chemical's MR-6) was dipped in a hard coat composition consisting essentially of a methanol sol dispersion of γ-glycidoxypropylmethyltrimethoxysilane, methyltrimethoxysilane partial hydrolysate and titanium oxide-iron oxide-silica, and containing a curing catalyst of aluminium acetylacetonate and a silicone surfactant (the hard coat of the composition has a refractive index of 1.58), and the film formed on the lens base was thermally cured at 120° C. for 1 hour. Next, the resulting hard coat lens was dipped in Diakite HCR-26 (Diafloc's detergent consisting essentially of a phosphate and a silicate) heated at 60° C., for 2 hours. After having been taken out of the detergent, the lens was washed with water and dried. The hard coat was removed from the lens, and the lens surface was not roughened at all.

Example 4:

The hard coat lens as prepared in the same manner as in Example 3 was dipped in an aqueous solution comprised of 20 parts of sodium metasilicate and 80 parts of water and heated at 40° C., for 7 minutes. After having been taken out of the solution, the lens was washed with water and dried. The hard coat was removed from the lens, and the lens surface was not roughened at all.

The concentration and the temperature of the salts to be used in the invention depend on the property of the hard coat and that of the lens base. In general, however, the concentration may fall between 5 and 50% or so, and the temperature may fall between 20 and 90° C. or so. The contact time depends on the chemical and physical properties of the hard coat, but, in general, may fall between 5 minutes and 10 hours or so. Contact for a longer period of time will be acceptable but is unfavorable in view of the economical aspect of the method. Desirably, the coat removal is attained within the shortest possible period of time. The most characteristic feature of the hard coat removing method of the invention using a specific aqueous solution of a silicate and/or a phosphate, by which the invention is basically differentiated from any other prior art methods, is that, even when hard coat lenses kept in contact with the solution for a long period of time, the solution has few negative influences on the urethane lens base and therefore the coat-removed lens base can be re-used.

As has been mentioned in detail hereinabove, the coat removing method of the invention is excellent in that failed products as formed in a process of producing plastic lenses coated with a hard coat can be regenerated to be in a reusable condition without adversely affecting the surface condition of the lens base, and that the thus-regenerated base can be again coated with a hard coat to give good products. Thus, the method of the invention is greatly effective in reducing the production costs and in effectively using natural resources.

What is claimed is:

1. A method for removing a hard coat from plastic lenses, the hard coat consisting essentially of an organopolysiloxane compound and an inorganic oxide, the method comprising:

contacting the plastic lenses with an aqueous solution of at least one of a silicate and a phosphate including at least one of sodium and potassium salts, a concentration of said at least one of the silicate and the phosphate in said aqueous solution being about 5% to about 50%; and continuing said step of contacting for a time period of at least about 5 minutes while maintaining said aqueous solution at a temperature of between about 20° C. and about 90° C.

2. A method according to claim 1, wherein the time period in said step of continuing is between about 5 minutes and about 10 hours.

3. A method according to claim 1, wherein said plastic lenses include a lens comprised of a material selected from the group consisting of urethane resin, acrylic resin, polycarbonate resin and ADC resin.

4. A method according to claim 1, wherein said at least one of the silicate and the phosphate includes trisodium phosphate.

* * * * *